Patented July 29, 1952

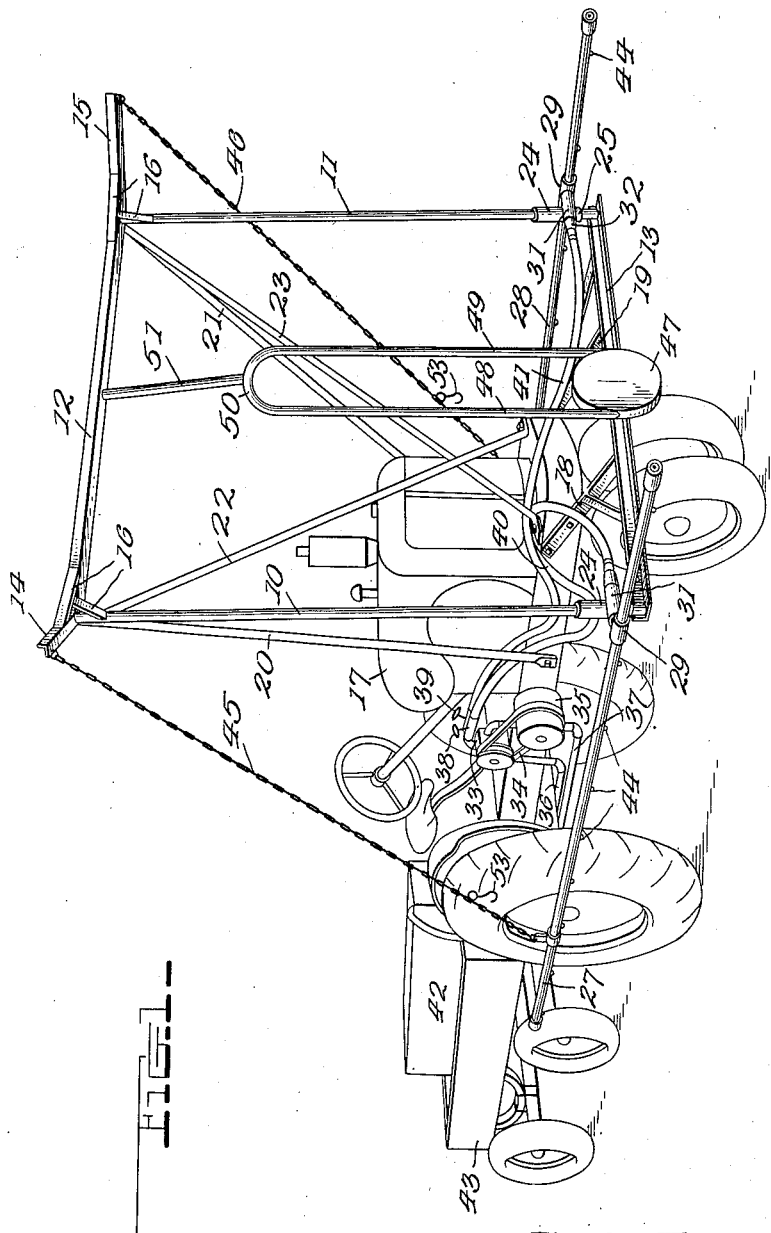

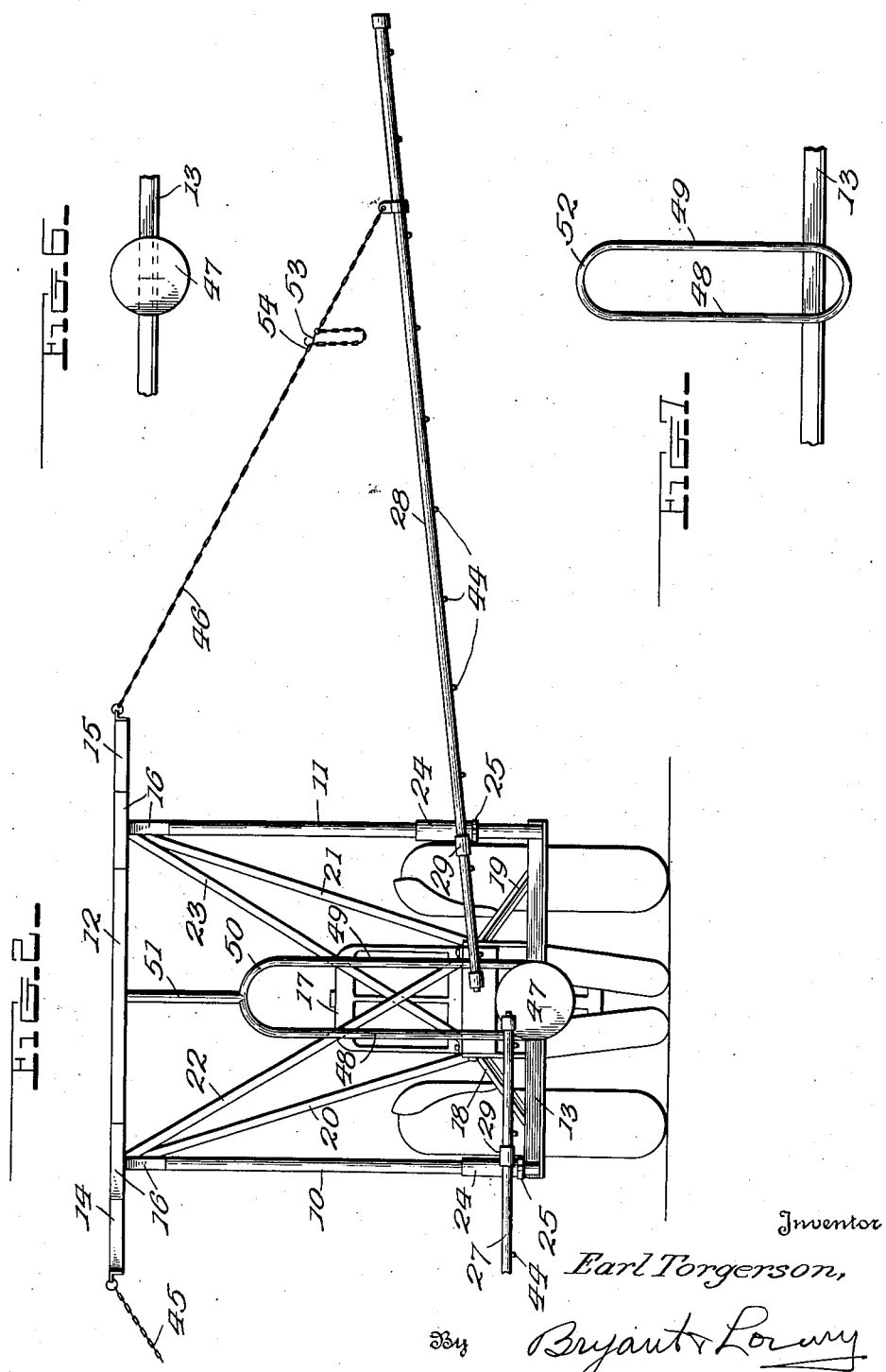

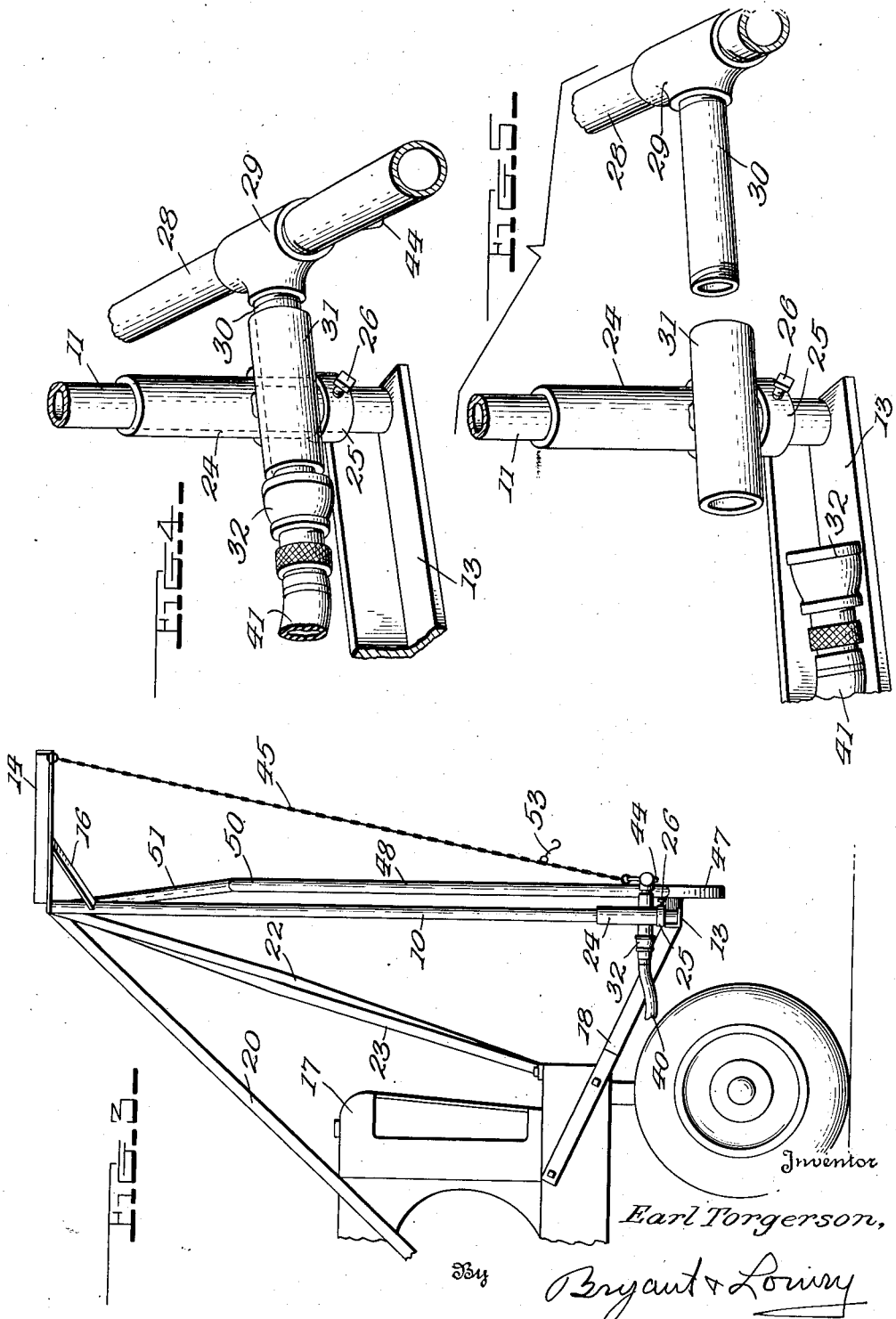

2,605,135

UNITED STATES PATENT OFFICE 2,605,135

SPRAYING APPARATUS

Earl Torgerson, Minneota, Minn.

Application May 19, 1949, Serial No. 94,152

6 Claims. (Cl. 299—30)

This invention relates in general to spraying apparatus used on vegetation, and is adaptable for mounting on a farm vehicle, such as a tractor.

The object of this invention is to construct a simple supporting frame adaptable for mounting on the front of a vehicle, such as a farm tractor, for supporting a pair of sprayer booms one on each side of the frame, the inner ends of the booms being pivotally mounted for swinging the booms back to a trailing position alongside the vehicle if their outer ends are dropped to the ground as the vehicle moves forward, and means on said frame for normally adjustably supporting the outer ends of the booms at any height off the ground laterally of the frame, while permitting them to swing back if they meet with any obstructions.

Another object is to construct the frame defined above from readily available beam and pipe material usually found on a farm and to adjustably support the inner ends of the booms at any desired height above the ground within the limits of the frame.

It is a further object of the invention to provide a spraying attachment for tractors and the like having a pair of laterally extending booms, wherein each boom is capable of independent height adjustment with relation to the ground while at the same time, regardless of its height from the ground, it may be maintained substantially parallel to the ground surface, thus providing for crops of different heights planted on substantially level ground.

Still another object of the invention is the provision of a spraying attachment having a pair of booms so constructed as to provide a substantially unbroken and continuous spray feeding conduit, while at the same time requiring only two base connections, one for each boom, and permitting the boom to sway rearwardly when hit by an obstruction.

Other and more specific objects will become apparent in the following detailed description of some preferred forms of supporting frames constructed in accordance with the present invention, having reference to the accompanying drawings, wherein:

Fig. 1 is a perspective view of the apparatus mounted on the front end of a farm tractor.

Fig. 2 is a partial front view of the same, showing the booms suspended in normally laterally extended position.

Fig. 3 is a side elevation of the apparatus.

Fig. 4 is a detail partial view of the pivotal connection of one of the booms to the supporting frame.

Fig. 5 is a similar view with the boom disconnected.

Figs. 6 and 7 show modified forms of the bumper portion of the frame which acts as a stop for the inner ends of the booms in their laterally extended positions.

The main portion of the supporting frame comprises two substantially vertical tubular members 10 and 11, such as standard one inch pipes, held together by cross members 12 and 13 at the top and bottom respectively, which members may be L-sectioned steel beams, one and one half inches at the top and two inches at the bottom. The top beam 12 has end portions 14 and 15 extending beyond the vertical members 10 and 11. These portions are bent forward and are braced by brackets 16 at the corners of the bends.

This main portion of the frame is shown mounted on the front of the farm tractor 17 by means of a pair of beams or rods 18 and 19 extending from the sides of the tractor frame to the lower beam 13, another pair of rods 20 and 21 similarly extending to the top beam 12, and a pair of crossed diagonal rods 22 and 23 extending from the front of the tractor frame to the upper beam 12.

Each vertical member 10 and 11 has a short piece of one and one quarter inch pipe 24 telescopically mounted thereon for slidable adjustment by means of a stop collar 25 which may be fixed at any height on the vertical member by means of a set screw 26, to adjustably support the inner ends of the spray booms 27 and 28. Each boom has a T fitting 29 near its inner end, with a nipple 30 connected thereto. Each piece 24 has another short piece of one and one quarter inch pipe 31 welded thereto at right angles as shown, through which the nipple 30 is passed before attaching a hose connection 32 to the other end of the nipple, for connection to a supply of the spray material under pressure, such as the pump 33. This pump may be driven by a belt 34 from a drive pulley 35 operated by the tractor engine. The pump illustrated has two inlets 36 and 37 and two outlets controlled by valves 38 and 39 connected to the delivery hose 40 and 41, which have hose connections 32 for connection to the nipples 30 of the spray booms 27 and 28. The spray fluid may be carried in a tank 42 hauled in a cart or wagon 43 behind the tractor.

Thus, the spray booms, which are provided with nozzles 44 distributed along their lengths, are pivotally supported at their inner ends in the portions 31 of the vertically adjustable pipe pieces 24. At their outer ends the booms are supported by chains 45 and 46 fastened to the extreme ends of the upper beam. These extreme ends, being forward and outward of the pivotal support pieces 24 and 31, tend to swing the outer ends of the spray booms outwardly and forwardly to a laterally extending position, and the inner ends of the booms strike the bumper plate 47 which is mounted on the lower beam 13, thus stopping the forward motion of the booms but permitting them to swing backwardly when they hit an obstruction or when it is desired to set the sprayer for road travel.

The bumper plate 47 may be supplemented by bumper bars 48 and 49 formed by a U-shaped pipe 50, the open end of which is fixed to the bumper plate 47 and the closed end braced by pipe 51 to the upper beam 12. Alternatively, the bumper plate 47 may be used by itself as shown in Fig. 6, or it may be omitted and the bumper bars may be used by themselves, formed simply by an ovally bent pipe 52, as shown in Fig. 7.

If the bumper plate 47 is used by itself, the vertically adjustable pivots 24—31 should not be moved up to a position such that the inner end of the corresponding boom would be moved out of the range of the bumper plate, but if the bumper bars shown in Fig. 2 or Fig. 7 are used these adjustable pivots may be moved to any height, as long as the inner ends of the booms stay within the range of the bumper bars.

The outer ends of the spray booms may be raised to any height by hooking the hook 53 into any chain link 54 above it, so as to shorten the length of the chain supporting the boom. Each boom may be independently angled to adjust for sloping ground, such as when the sprayer vehicle is following the contours of a hill. Each boom may also be independently levelled at any desired height by moving the sleeves 24 along the post 11 and fixing them by means of the set screw 26. On level ground the sprayer will thus be adjustable to adjacent crops of different heights. This is a highly significant feature of the invention herein described in that the booms are of great length and, when extended, cover a considerable amount of ground. It is well known that heights of the same crop vary according to spot soil, drainage and shade conditions and also that strip farming is quite common, with different types of crops being planted in immediately adjacent strips.

The spray booms may thus be adjusted to accommodate any rows of vegetation as well as to clear bordering fences and the like, when necessary. In any adjustment, however, the booms are resiliently held in a laterally extended position so as to give way by swinging backwardly in case any obstruction is hit. When the obstruction is passed, the boom automatically swings laterally outward by reason of the eccentric suspension.

The main frame is made wide enough that if the chain suspension should break or accidentally disconnect, the corresponding boom will trail along the tractor clear of the side wheels, and will not be damaged by swinging into the wheels.

Many obvious modifications may be made in the form and arrangement of the several parts of the apparatus without departing from the spirit and scope of this invention, as defined in the appended claims.

What is claimed is:

1. Farm spraying apparatus comprising a supporting frame adaptable for mounting on a vehicle, said frame having vertical side members with horizontal bearings slidably and rotatably mounted thereon, a spray boom pivotally mounted in each bearing by means of a pivot element extending in a direction normal to said boom from a point spaced from its inner end, each said pivot element having a fluid passage associated therewith for supplying a spray fluid to the boom from a connected flexible conduit, and means for adjustably suspending the outer end of each boom from a point forwardly and outwardly of the upper end of each vertical side member so as to normally and separately bias each boom to an extended lateral position but permitting it to swing backwardly when met by an obstruction.

2. Farm spraying apparatus as defined in claim 1, and bumper means for the inner ends of said booms located centrally of the frame for stopping said booms in a laterally extended position as they are biased in that direction by said suspending means but permitting them to swing rearwardly when met by an obstruction.

3. Farm spraying apparatus as set forth in claim 2 wherein said bumper means extends vertically for substantially the greater portion of the length of the vertical side members to permit maximum vertical adjustment of the spray booms.

4. Farm spraying apparatus as defined in claim 1, wherein said boom pivot comprises a pipe nipple connected to a T in said boom, and a hose connection for supplying spraying material to the other end of said nipple.

5. Farm spraying apparatus as defined in claim 1 wherein the inner ends of said booms extend to approximately a mid-point between the vertical side members so as to cause the two booms to form a substantially continuous spray element, and bumper means for the inner ends of said booms located approximately at said mid-point for stopping said booms in a laterally extended position as they are biased in that direction by said suspending means but permitting them to swing rearwardly when met by an obstruction.

6. Farm spraying apparatus comprising a supporting frame adaptable for mounting on a vehicle, a pair of spray booms pivotally attached to said frame at a point intermediate the ends of each boom so as to permit the booms to swing rearwardly and parallel to the vehicle body, the inner ends of said booms meeting at substantially the mid-point of said supporting frame so as to form of the two booms a substantially continuous spray element, means for admitting liquid spray to each boom through said pivot points, means to normally bias said booms in a position laterally of the vehicle body, and bumper means on said frame meeting the inner ends of said booms to stop them in a laterally extended position while permitting them to swing rearwardly when meeting an obstruction.

EARL TORGERSON.

REFERENCES CITED

The following references are of record in the file of this patent:

UNITED STATES PATENTS

| Number | Name | Date |
|---|---|---|
| 604,479 | Nichol | May 24, 1898 |
| 648,414 | Kenison | May 1, 1900 |
| 1,539,789 | Walker | May 26, 1925 |
| 2,152,407 | Fawley | Mar. 28, 1939 |
| 2,221,433 | Pitner | Nov. 12, 1940 |
| 2,273,344 | Black et al. | Feb. 17, 1942 |
| 2,305,913 | Troyer | Dec. 22, 1942 |
| 2,539,288 | Van Horn | Jan. 23, 1951 |

FOREIGN PATENTS

| Number | Country | Date |
|---|---|---|
| 491,902 | France | Feb. 20, 1919 |
| 781,039 | France | Feb. 18, 1935 |